R. H. McLAIN.
SYSTEM OF CONTROL.
APPLICATION FILED FEB. 8, 1912.
1,164,297.
Patented Dec. 14, 1915.
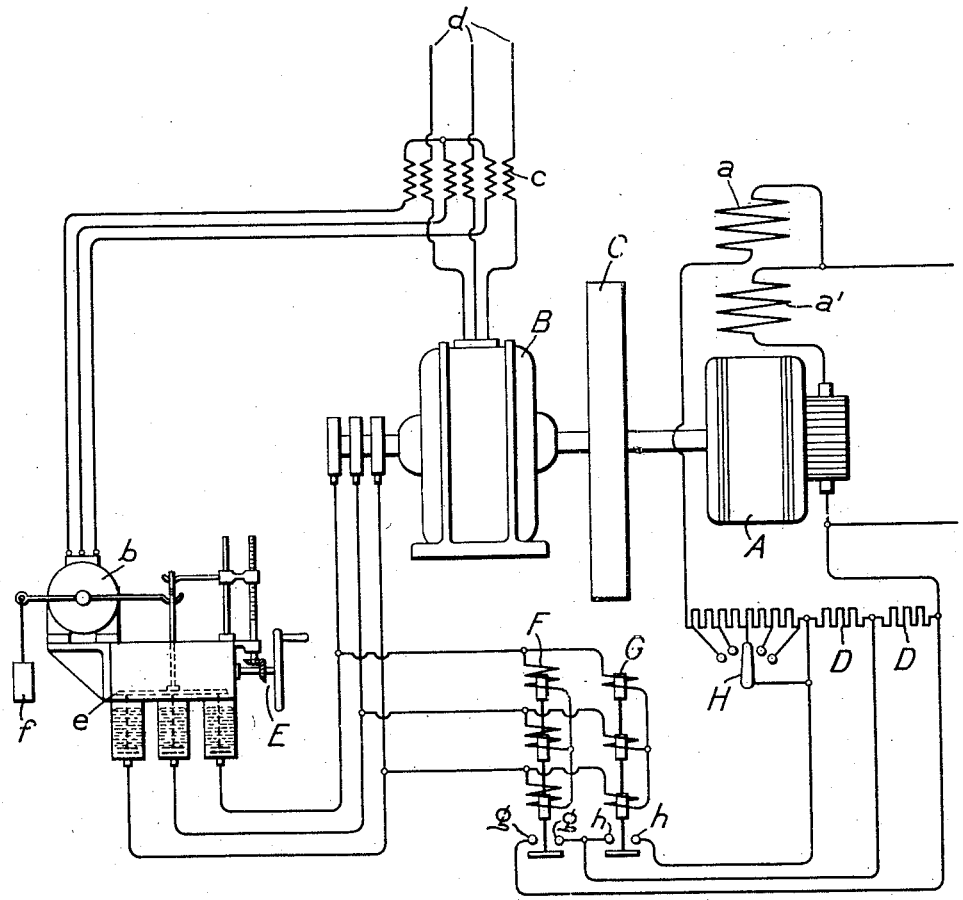
Witnesses:
Earl G. Klock.
J. Ellis Glen.
Inventor:
Robert H. McLain,
by
His Attorney.

UNITED STATES PATENT OFFICE.

ROBERT H. McLAIN, OF SCHENECTADY, NEW YORK, ASSIGNOR TO GENERAL ELECTRIC COMPANY, A CORPORATION OF NEW YORK.

SYSTEM OF CONTROL.

1,164,297.   Specification of Letters Patent.   Patented Dec. 14, 1915.

Application filed February 8, 1912. Serial No. 676,270.

*To all whom it may concern:*

Be it known that I, ROBERT H. MCLAIN, a citizen of the United States, residing at Schenectady, county of Schenectady, State of New York, have invented certain new and useful Improvements in Systems of Control, of which the following is a specification.

My invention relates to a system of control and particularly to the control of motor generator sets in which the motor is of the variable speed type.

My invention has for its object to compensate for the voltage drop produced in the generator of a motor generator set when the speed of the set is reduced.

To this end my invention consists in certain features of novelty which will be pointed out with particularity in the claims annexed to and forming a part of this specification.

For a better understanding of my invention, however, and other advantages possessed by it, reference may be had to the following description taken in connection with the accompanying drawing in which the single figure shows diagrammatically a control system in accordance with my invention.

Referring to the drawings, A is a generator and B a variable speed motor. The motor B drives the generator A in any well known manner, and throughout the specification and claims I have used the term "motor generator set", to mean a motor mechanically connected to a generator in any way. I have preferred to illustrate the motor and generator as a set directly coupled together and to a fly-wheel C. When the load on the generator A and consequently the load on the set is increased beyond a certain limit, such a set is arranged so that the speed of the motor tends to decrease, and thus permits the fly-wheel to give up energy to assist the motor in overcoming the increased load. Since the generator A is mechanically connected to the motor B, its speed is also reduced, and consequently its voltage. In accordance with my invention, means are provided in a circuit connected to said motor for strengthening the generator field as the speed of the motor decreases, and consequently tending to compensate for the voltage drop of the generator due to its decrease in speed. In order to strengthen the generator field as the speed of the motor decreases, I provide one or more sections D of resistance in the circuit of the shunt field winding $a$ of the generator, which are short-circuited as the speed of the motor is decreased. I have also shown a hand operated rheostat H in the field circuit of the generator, so that the voltage of the generator may be changed by hand, and a field winding $a'$ in series with the armature of the generator, the purpose of which will be hereinafter explained.

The particular motor which I have illustrated is of the induction type provided with slip rings. An automatic rheostat or slip regulator E is connected to the slip rings, and is arranged to cut resistance into or out of the rotor circuit of the induction motor. This slip regulator consists of a slip regulating or "torque" motor $b$, supplied with current from a series transformer $c$, which is inserted in the alternating current supply mains $d$, and of a water rheostat $e$, the blades of which are separated or brought together by a slight motion of the motor $b$. This torque motor does not rotate, but simply exerts a torque and is similar in its action to a solenoid. Also connected across the slip rings of the induction motor B are relays F and G, which are arranged to short circuit the resistances D, as the speed of the motor B falls, as will be hereinafter explained. I have shown the relays F and G as being calibrated by their number of turns but any well known method of calibration may be used.

The operation of my system of control is as follows: The current taken from the alternating current mains by the motor B of the fly-wheel motor-generator set is prevented from exceeding a certain amount by means of the slip regulator E. When the induction motor is lightly loaded, the torque of the motor $b$ and the weight $f$ are overbalanced by the weight of the blades of the rheostat $e$. This rheostat is practically short circuited in this position. As the load on the generator A is increased, the current taken by the motor B, the current transformed by the series transformer and consequently the torque of the motor $b$ is proportionally increased. As this torque increases, the blades of the rheostat are separated in order to balance the torque of the motor $b$ and the weight $f$. This separation of the blades of the rheostat inserts resistance in the rotor circuit of the induction motor B and tends to slow it down, thereby permitting the fly-wheel C to give up some of its stored up energy. As is well known, the slowing down of the rotor of an induction motor, or in other words, an increase of its slip, increases the voltage between its slip rings, and since this voltage is supplied to the relays F and G, the relay F, which I have shown as having the greater number of turns, will pick up first and close the circuit across the contacts $g$, $g$, thereby short circuiting one of the sections D of resistance. This short circuiting or cutting out of the section of resistance in series with the field winding $a$ of the generator, increases the field strength of the generator, and, although it is running at slower speed, the drop in voltage, due thereto, is compensated for. As the load on the generator A increases still further or continues at an overload, and slows down the motor generator set still more, the voltage across the slip rings of the induction motor will be increased and the relay G, which I have shown as having a fewer number of turns than the relay F, will operate to close the circuit across the contacts $h$, $h$, thus cutting out the other section of resistance, and compensating for this still further decrease in speed. My system will operate in the same way even though the generator of the set is supplied with a series field winding in series with the generator armature, as is often found desirable, so that as the load on the generator of the set increases, the generator voltage will increase to compensate for the drop in the lines connecting the load with the generator. If such a set slows down with the increase of load it becomes difficult and expensive to compensate for the tendency of the voltage to fall due to this decrease in speed with the systems heretofore known and used, because such systems depend upon changes in load and voltage for their operation. My invention is particularly applicable however to such a compound wound set, because it depends for its operation only on the speed of the motor of the set and is entirely independent of the voltage of the generator.

Although I have described my invention in connection with a motor generator set, in which the generator is the main generator supplying the load, it is equally applicable to a set in which the generator is used for other purposes, and I aim in the appended claims to cover such a modification as well as any other modifications which do not involve a departure from the spirit and scope of my invention.

What I claim as new and desire to secure by Letters Patent of the United States, is:—

1. In combination, a direct current generator, a variable speed electric motor driving said generator, a resistance in the field circuit of said generator, a circuit connected to said motor, and means in said circuit for short-circuiting said resistance as the speed of said motor decreases.

2. In combination, a direct current generator, a variable speed electric motor driving said generator, a resistance in the field circuit of said generator, a circuit connected to said motor, and means in said circuit and depending upon the speed of said motor for short-circuiting said resistance as the speed of said motor decreases.

3. In combination, a direct current generator, a variable speed electric motor driving said generator, a resistance in the field circuit of said generator, a circuit connected to said motor, and a relay in said circuit and operative upon a change of speed of said motor for short-circuiting said resistance as the speed of said motor decreases.

4. In combination, a direct current generator, an induction motor driving said generator, a resistance in the field circuit of said generator, and means connected in the secondary circuit of said motor for short-circuiting said resistance as the speed of said motor decreases.

5. In combination, a direct current generator, an induction motor driving said generator, a resistance in the field circuit of said generator, a relay in the secondary circuit of said motor, said relay being arranged to short-circuit the resistance in the field circuit of said generator as the speed of said motor decreases.

6. In combination, a direct current generator, an induction motor driving said generator, a resistance in the field circuit of said generator, a circuit connected to said motor, and means in said circuit and depending on the slip of said motor for short-circuiting said resistance as the slip of said motor increases.

7. In combination, supply mains, a fly-wheel motor-generator set comprising a direct current generator, a fly-wheel and a variable speed electric motor, said motor being connected to said mains, means for varying the speed of said motor so as to permit the fly-wheel to return energy to said mains, a resistance in the field circuit of said generator, a circuit connected to said motor, and means in said circuit for short-circuiting said resistance as the speed of said motor decreases.

8. In combination, supply mains, a fly-wheel motor-generator set comprising a direct current generator, a fly-wheel and a variable speed electric motor, said motor being connected to said mains, means for varying the speed of said motor so as to permit the fly-wheel to return energy to said mains, a resistance in the field circuit of said generator, a circuit connected to said motor, and means in said circuit and depending upon the speed of said motor for short-circuiting said resistance as the speed of said motor decreases.

9. In combination, supply mains, a fly-wheel motor-generator set comprising a direct current generator, a fly-wheel and a variable speed electric motor, said motor being connected to said mains, means for varying the speed of said motor so as to permit the fly-wheel to return energy to said mains, a resistance in the field circuit of said generator, a circuit connected to said motor, and a relay in said circuit and operative upon a change of speed of said motor for short-circuiting said resistance as the speed of said motor decreases.

10. In combination, supply mains, a fly-wheel motor-generator set comprising a direct current generator, a fly-wheel and an induction motor, said motor being connected to said mains, means for varying the speed of said induction motor so as to permit the fly-wheel to return energy to the said mains, a resistance in the field circuit of said generator, and means connected to the secondary circuit of said motor for short-circuiting said resistance as the speed of said motor decreases.

11. In combination, supply mains, a fly-wheel motor-generator set comprising a direct current generator, a fly-wheel and an induction motor, said motor being connected to said mains, means for varying the speed of said induction motor so as to permit the fly-wheel to return energy to said mains, a resistance in the field circuit of said generator, a relay in the secondary circuit of said motor, said relay being arranged to short-circuit the resistance in the field circuit of said generator as the speed of said motor decreases.

12. In combination, a direct current generator having a shunt field winding and a series field winding, a variable speed electric motor driving said generator, a resistance in the shunt field circuit of said generator, a circuit connected to said motor, and means in said circuit for short-circuiting said resistance as the speed of said motor decreases.

13. In combination, a direct current generator having a series field winding and a shunt field winding, a variable speed electric motor driving said generator, a resistance in the shunt field circuit of said generator, a circuit connected to said motor, and means in said circuit and depending upon the speed of said motor for short-circuiting said resistance as the speed of said motor decreases.

14. In combination, a direct current generator having a shunt field winding and a series field winding, a variable speed electric motor driving said generator, a resistance in series with said shunt field winding, a circuit connected to said motor and a relay in the said circuit and operative upon a change of speed of said motor for short-circuiting said resistance as the speed of said motor decreases.

In witness whereof, I have hereunto set my hand this 7th day of February, 1912.

ROBERT H. McLAIN.

Witnesses:
 BENJAMIN B. HULL,
 HELEN ORFORD.